(12) United States Patent
Shigetomi et al.

(10) Patent No.: US 8,244,100 B2
(45) Date of Patent: Aug. 14, 2012

(54) INFORMATION APPARATUS FOR REPRODUCING COMMERCIAL BROADCAST INFORMATION AND METHOD OF SAME

(75) Inventors: Tetsu Shigetomi, Kanagawa (JP); Hirofumi Sugitani, Kanagawa (JP); Tatsuro Kurachi, Kanagawa (JP)

(73) Assignee: Sony Corporation, Tokyo (JP)

( * ) Notice: Subject to any disclaimer, the term of this patent is extended or adjusted under 35 U.S.C. 154(b) by 1754 days.

(21) Appl. No.: 10/081,973

(22) Filed: Feb. 21, 2002

(65) Prior Publication Data

US 2002/0150380 A1    Oct. 17, 2002

(51) Int. Cl.
*H04N 9/80* (2006.01)
*H04N 7/10* (2006.01)

(52) U.S. Cl. .......................... 386/249; 386/250; 725/32

(58) Field of Classification Search ..................... None
See application file for complete search history.

(56) References Cited

U.S. PATENT DOCUMENTS

| | | | |
|---|---|---|---|
| 5,027,400 A * | 6/1991 | Baji et al. | 725/116 |
| 5,838,314 A * | 11/1998 | Neel et al. | 725/8 |
| 6,282,713 B1 * | 8/2001 | Kitsukawa et al. | 725/36 |
| 6,285,818 B1 * | 9/2001 | Suito et al. | 386/46 |
| 6,496,857 B1 * | 12/2002 | Dustin et al. | 709/219 |
| 6,564,379 B1 * | 5/2003 | Knudson et al. | 725/42 |
| 6,574,424 B1 * | 6/2003 | Dimitri et al. | 386/125 |
| 6,973,669 B2 * | 12/2005 | Daniels | 725/112 |
| 6,993,245 B1 * | 1/2006 | Harville | 386/46 |
| 7,013,477 B2 * | 3/2006 | Nakamura et al. | 725/32 |
| 2002/0019769 A1 * | 2/2002 | Barritz et al. | 705/14 |
| 2002/0166120 A1 * | 11/2002 | Boylan et al. | 725/35 |
| 2002/0192060 A1 * | 12/2002 | Teissler et al. | 414/403 |
| 2003/0192060 A1 * | 10/2003 | Levy | 725/133 |
| 2005/0108095 A1 * | 5/2005 | Perlmutter | 705/14 |

* cited by examiner

*Primary Examiner* — William C Vaughn, Jr.
*Assistant Examiner* — Heather Jones
(74) *Attorney, Agent, or Firm* — Frommer Lawrence & Haug LLP; William S. Frommer; Thomas F. Presson

(57) ABSTRACT

An information reproducing apparatus for making sure a viewer watches commercial broadcast information contained in broadcast information. Concretely, a sequentially supplied series of broadcast data is stored in a storage unit linked with a supplied sequence. Also, based on predetermined identification information contained in this broadcast data, the commercial portions of the broadcast data are detected at a commercial detector. At the time of reproduction of the broadcast data, the detected commercial portions are first sequentially read from the storage unit and reproduced as images, audio, etc. at a reproduction unit. Then, after all detected commercial portions are reproduced, another series of broadcast data other than the commercial portions is read from the storage unit in sequence in accordance with the supplied sequence and reproduced at the reproduction unit.

28 Claims, 7 Drawing Sheets

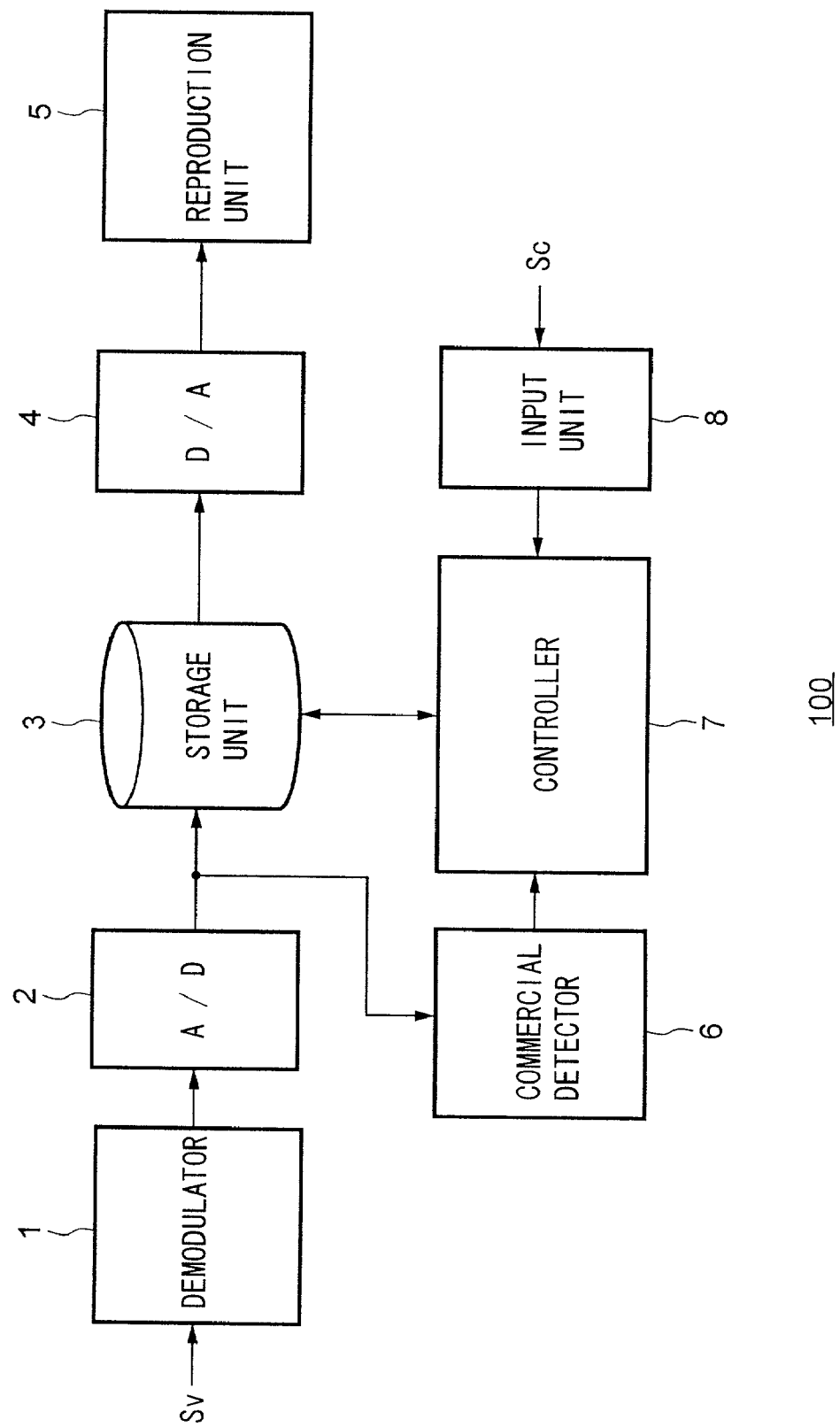

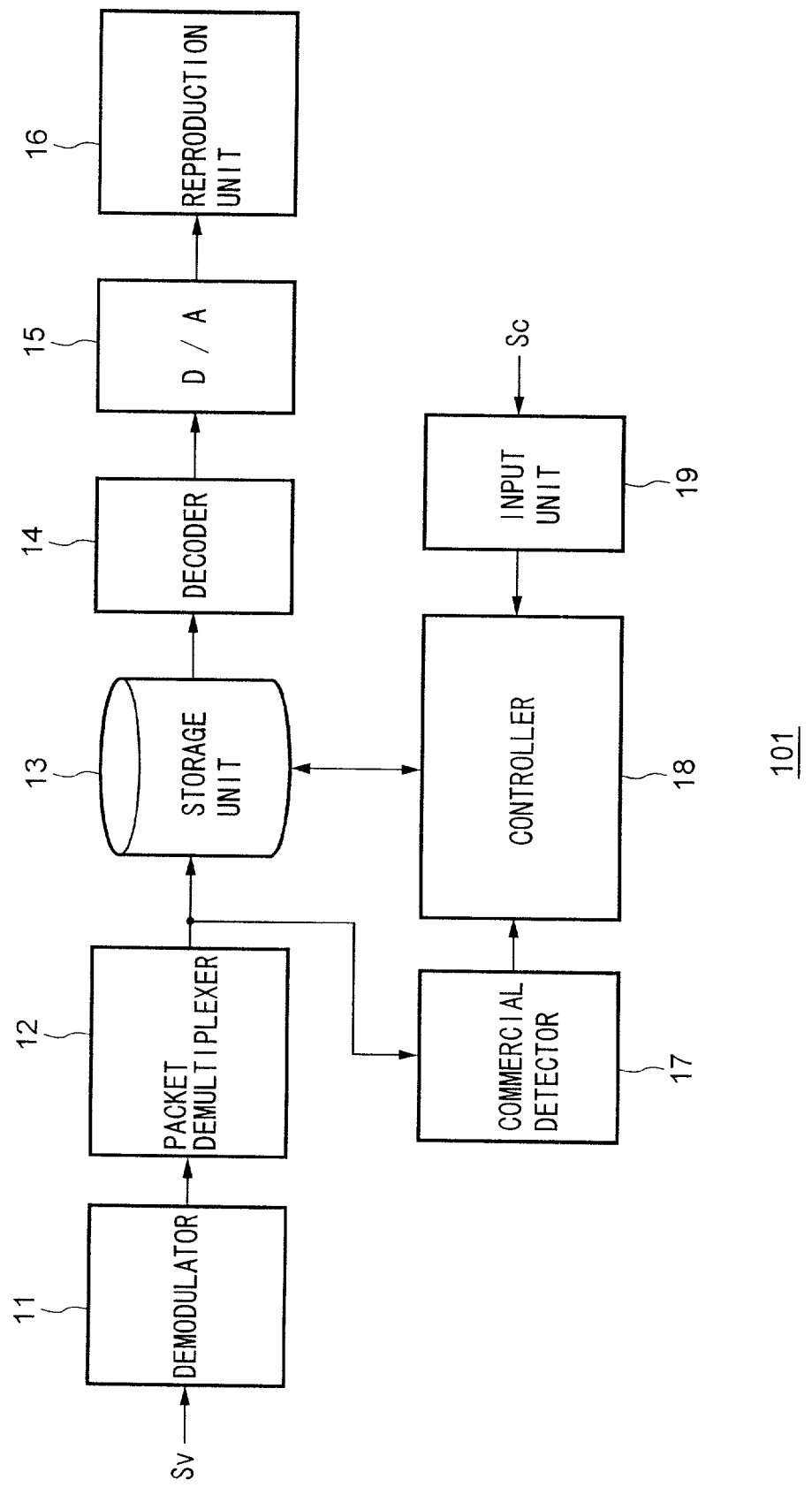

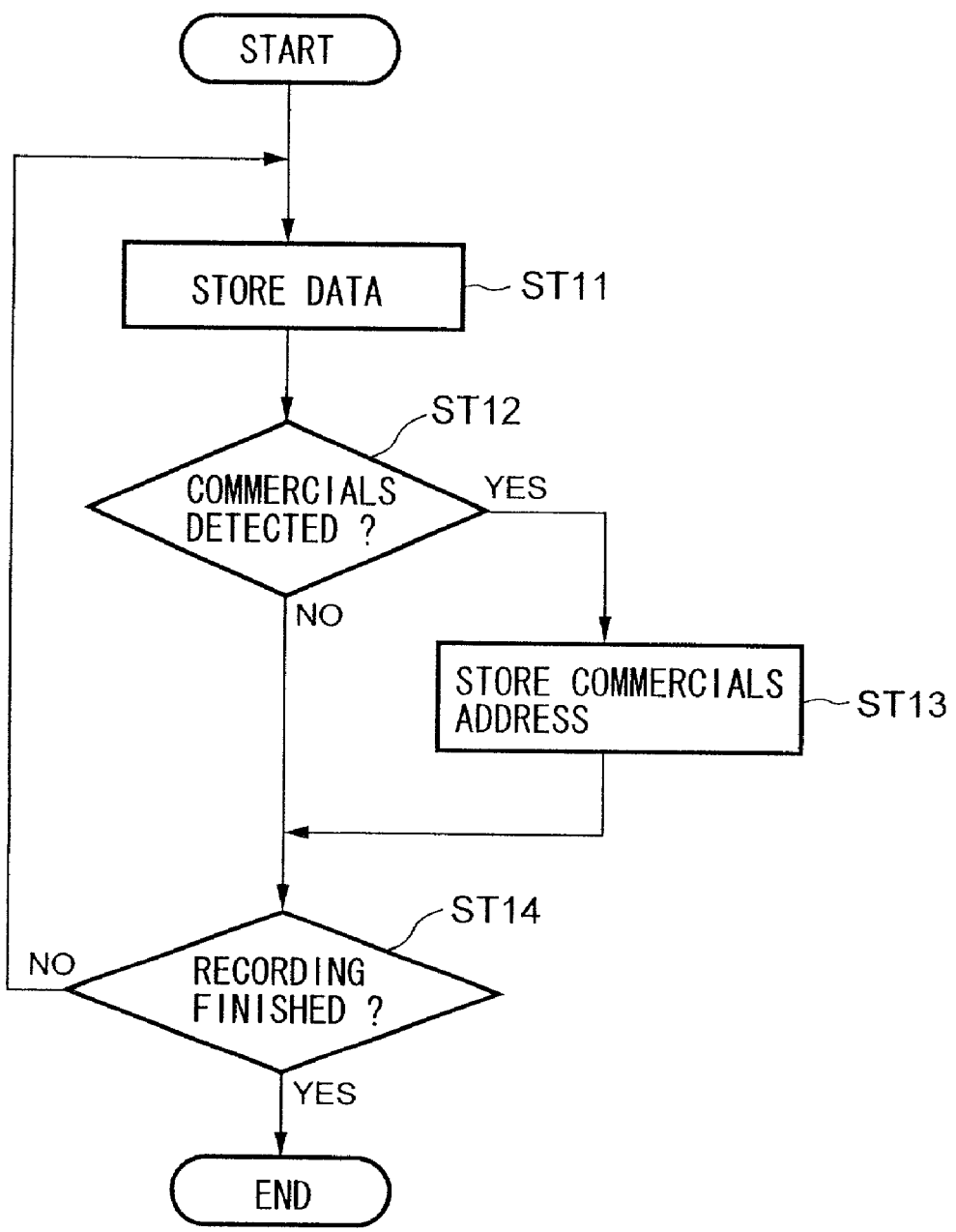

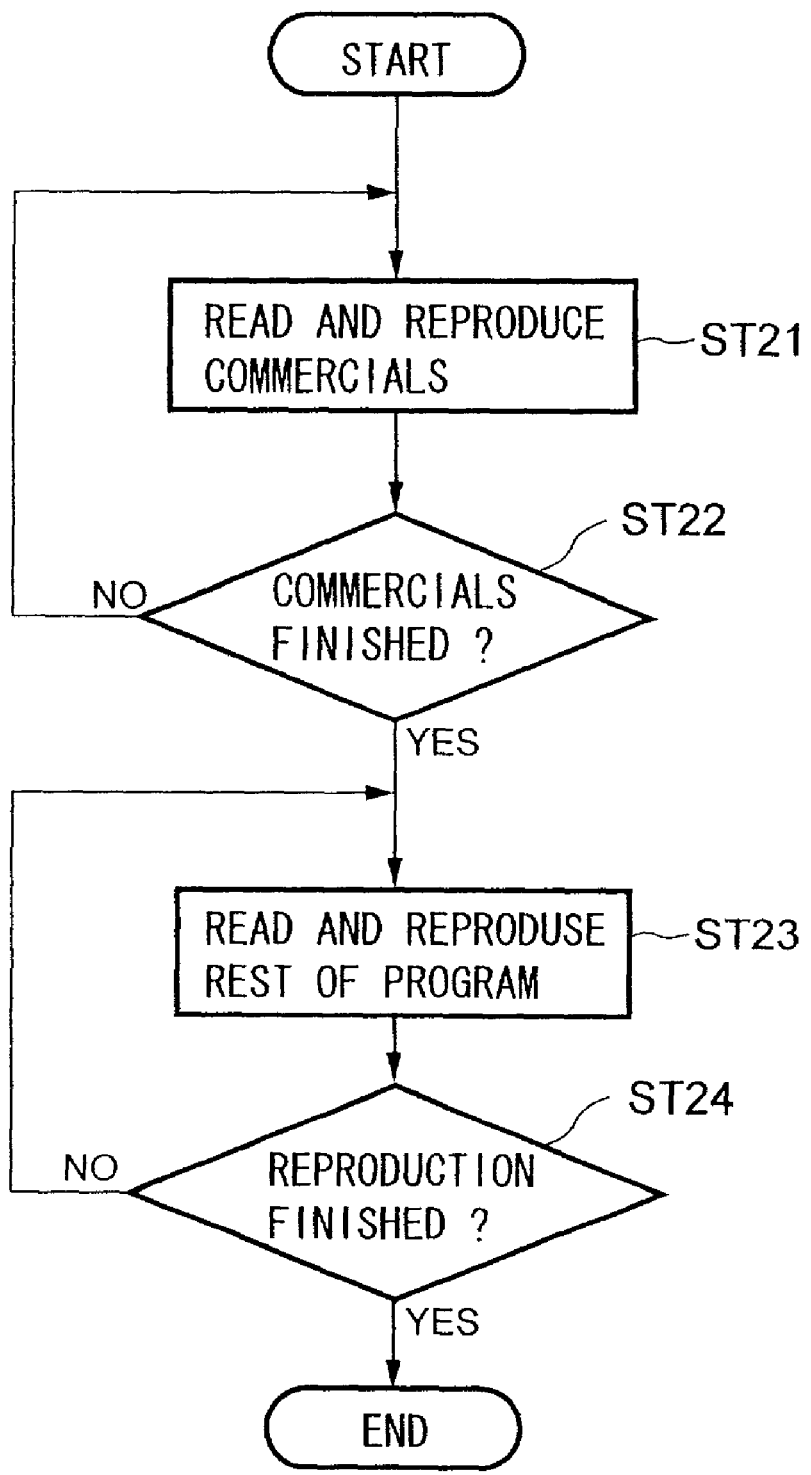

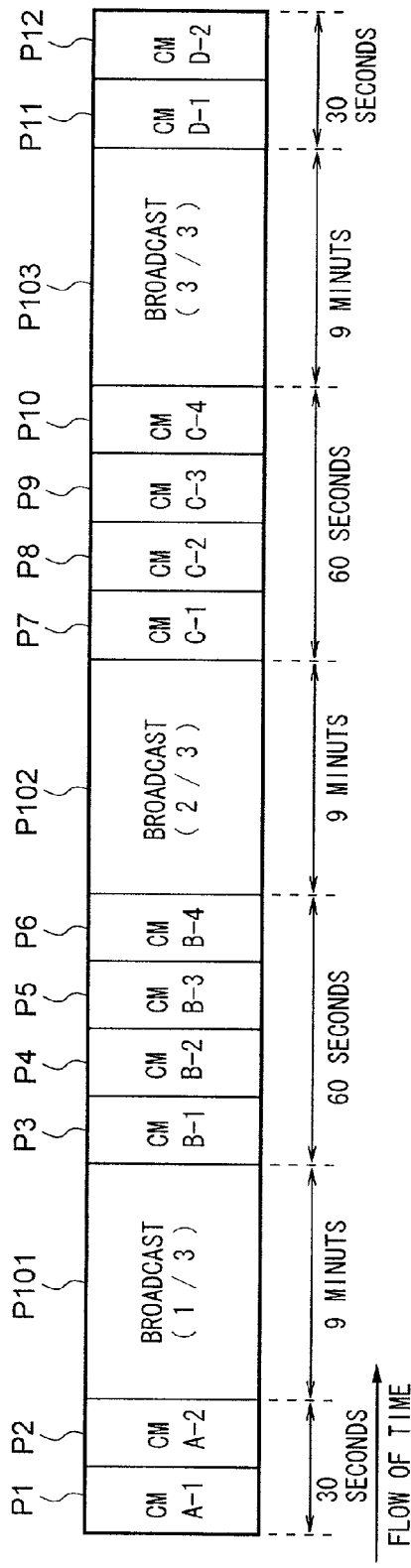
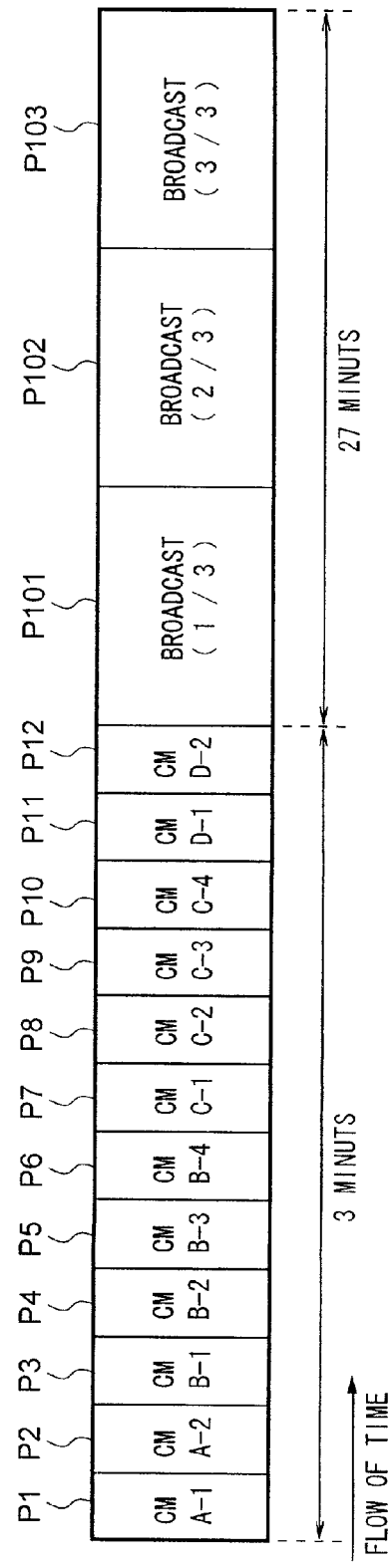
FIG.5A
FIG.5B

INFORMATION APPARATUS FOR REPRODUCING COMMERCIAL BROADCAST INFORMATION AND METHOD OF SAME

BACKGROUND OF THE INVENTION

1. Field of the Invention

The present invention relates to an information reproducing apparatus for reproducing broadcast information including commercial broadcast information and to a method of the same, for example, relates to an information reproducing apparatus for reproducing a television broadcast, radio broadcast, etc. including commercial broadcast and to a method of the same.

2. Description of the Related Art

As a recording and reproducing apparatus of a television broadcast, a video tape recorder (VTR) has been generally used, but along with the partial digitalization of television broadcasts and the drop in price of hard disk drives in recent years, recording and reproducing apparatuses storing digital television signals using hard disk drives have been appearing.

In a time shift viewing of television broadcasts using VTRs, the general practice is to view just the intended broadcast by playing back the tape while fast forwarding over the commercial portions contained in the broadcast or by not recording the commercial portions by using a commercial cutting function provided in the VTR.

However, even if fast forwarding in the VTR, the image is not erased, so it is possible to obtain a grasp of what kind of commercial is being broadcast. When an image catching the eye of the viewer is included, sometimes the fast forwarding is stopped and the commercial broadcast is watched.

Further, with the commercial cutting function of a VTR, the commercial portion is detected from for example the type of the audio signal (stereo broadcast or not), but when the target broadcast is a stereo broadcast, a commercial portion, which is usually broadcast in stereo, cannot be detected. Also, there is also the method of detecting a commercial broadcast from a strength of the sound or the interval between scene changes, but if the detection is imperfect, the commercial broadcast cannot be completely eliminated or part of the target broadcasts sometimes ends up also being cut.

Summarizing the disadvantages, in a recording and reproducing apparatus using a hard disk drive or other storage device with a high access speed, the speed of searching through a broadcast content is raised in comparison with a VTR mechanically winding up a tape, so when skipping just commercial broadcasts at the time of reproduction, there is a possibility in the viewer will no longer view the commercial broadcasts much at all.

On the other hand, television stations, which provide broadcast contents free to the viewers, obtain almost all of their revenue from advertisement fees obtained by broadcasting commercial broadcasts. Therefore, if such time shift viewing by recording and reproducing apparatuses becomes prevalent in society and broadcasted commercials are no longer watched by viewers, the advertising effect of broadcasted commercials will end up falling, advertisement revenue will fall, and stations may even be unable to continue operating.

SUMMARY OF THE INVENTION

An object of the present invention is to provide an information reproducing apparatus for making sure the viewers watch the commercial broadcast information contained in broadcast information and a method of the same.

To attain the above object, according to a first aspect of the present invention, there is provided an information reproducing apparatus having a storing means for storing a sequentially supplied series of broadcast information including commercial broadcast information linked with a supplied sequence, a commercial detecting means for detecting the commercial broadcast information from the broadcast information based on predetermined identification information contained in the broadcast information, a reproducing means for reproducing broadcast information stored in the storing means, and a controlling means for sequentially reading the detected commercial broadcast information from the storing means and making the reproducing means reproduce it and, when the detected commercial broadcast information is all reproduced, sequentially reading another series of broadcast information other than the related commercial broadcast information from the storing means and making the reproducing means reproduce it in accordance with the supplied sequence.

Preferably, the controlling means generates a viewing confirmation message at least one time, makes the reproducing means reproduce it, and suspends a read operation of the broadcast information from the storing means at the time of reproduction of the commercial broadcast information and restarts the read operation of the broadcast information when a response signal with respect to the related viewing confirmation message is detected.

In the information reproducing apparatus according to the first aspect of the present invention, the sequentially supplied series of broadcast information is stored in the storing means linked with the supplied sequence. Also, the commercial detecting means detects the commercial broadcast information from the broadcast information based on predetermined identification information contained in the broadcast information.

At the reproduction of the series of broadcast information, first, the detected commercial broadcast information is sequentially read from the storing means and reproduced at the reproducing means. When the detected commercial broadcast information is all reproduced, another series of broadcast information other than the related commercial broadcast information is sequentially read from the storing means in accordance with the supplied sequence and reproduced at the reproducing means.

Also, at the time of reproduction of the commercial broadcast information, a viewing confirmation message is generated at least one time and reproduced at the reproducing means and the read operation of the broadcast information from the storing means is suspended. When a response signal with respect to the related viewing confirmation message is detected, the read operation of the broadcast information is restarted.

According to a second aspect of the present invention, there is provided an information reproducing apparatus having a storing means for storing a sequentially supplied series of broadcast information including commercial broadcast information linked with a supplied sequence, a commercial detecting means for detecting the commercial broadcast information from the broadcast information based on predetermined identification information contained in the broadcast information, a reproducing means for reproducing the broadcast information stored in the storing means, an inputting means for inputting a commercial designation signal for designating the commercial broadcast information to be reproduced at the reproducing means, and a controlling means for sequentially reading the series of broadcast information from the storing means and making the reproducing means reproduce it in accordance with the supplied sequence, generating image information corresponding to the detected commercial broadcast information and combining the same with the reproduced image of the series of broadcast information, and making the reproducing means reproduce it, and, when the commercial designation signal is input, reading the commercial broadcast information designated by the related commercial designation signal from the storing means and making the reproducing means reproduce it, and, in the following reproduction of the series of broadcast information, reproducing the broadcast information while not reproducing, but skipping over the commercial broadcast information which has been already reproduced.

In the information reproducing apparatus according to the second aspect of the present invention, a sequentially supplied series of broadcast information is stored in the storing means linked with the supplied sequence. Also, the commercial detecting means detects the commercial broadcast information from the broadcast information based on predetermined identification information contained in the broadcast information.

At the time of reproduction of the series of broadcast information, the series of broadcast information is sequentially read from the storing means and reproduced at the reproducing means in accordance with the supplied sequence. At the same time, image information corresponding to the detected commercial broadcast information is generated, combined with the reproduced image of the series of broadcast information, and reproduced at the reproducing means. Then, when a commercial designation signal for designating commercial broadcast information reproduced at the reproducing means is input to the inputting means, the commercial broadcast information designated by the related commercial designation signal is read from the storing means and reproduced at the reproducing means. At the following reproduction of the series of broadcast information, the already reproduced commercial broadcast information is not reproduced but is skipped and only the other broadcast information is reproduced.

According to a third aspect of the present invention, there is provided an information reproduction method comprised of a storage step for storing a sequentially supplied series of broadcast information linked with a supplied sequence, a commercial detection step for detecting commercial broadcast information from the broadcast information based on predetermined identification information contained in the broadcast information, and a reproduction step for extracting and reproducing the detected commercial broadcast information from the broadcast information stored at the storage step and, when the detected commercial broadcast information is all reproduced, sequentially extracting and reproducing another series of broadcast information other than the related commercial broadcast information from the broadcast information stored at the storage step in accordance with the supplied sequence.

Preferably, the reproduction step is for generating and reproducing a viewing confirmation message at least one time and suspending the reproduction of the broadcast information at the time of reproduction of the commercial broadcast information and restarting the reproduction of the broadcast information when a response signal with respect to the related viewing confirmation message is detected.

In the information reproduction method according to the third aspect of the present invention, the sequentially supplied series of broadcast information is stored linked with the supplied sequence, and the commercial broadcast information is detected from the broadcast information based on the predetermined identification information contained in the broadcast information. At the time of reproduction of the series of broadcast information, first, the detected commercial broadcast information is extracted from the broadcast information stored at the storage step and reproduced. When the detected commercial broadcast information is all reproduced, another series of broadcast information other than the related commercial broadcast information is sequentially extracted and reproduced from the broadcast information stored at the storage step in accordance with the supplied sequence.

Also, a viewing confirmation message is generated at least one time and reproduced and the reproduction of the broadcast information is suspended at the time of reproduction of the commercial broadcast information. The reproduction of the broadcast information is restarted when a response signal with respect to the related viewing confirmation message is detected.

According to a fourth aspect of the present invention, there is provided an information reproduction method comprised of a storage step for storing a sequentially supplied series of broadcast information linked with a supplied sequence, a commercial detection step for detecting commercial broadcast information from the broadcast information based on predetermined identification information contained in the broadcast information, and a reproduction step for sequentially extracting and reproducing the series of broadcast information from among the broadcast information stored at the storage step in accordance with the supplied sequence and, at the same time, generating image information corresponding to the detected commercial broadcast information and combining the same with the reproduced image of the series of broadcast information, and, when the commercial designation signal is input, extracting and reproducing the commercial broadcast information designated by the commercial designation signal from the broadcast information stored at the storage step and, in the following reproduction of the series of broadcast information, reproducing the broadcast information while not reproducing, but skipping the already reproduced commercial broadcast information.

In the information reproduction method according to the fourth aspect of the present invention, the sequentially supplied series of broadcast information is stored linked with the supplied sequence, and commercial broadcast information is detected from the broadcast information based on predetermined identification information contained in the broadcast information. At the time of reproduction of the series of broadcast information, the series of broadcast information is sequentially extracted and reproduced from the broadcast information stored at the storage step in accordance with the supplied sequence and, at the same time, image information corresponding to the detected commercial broadcast information is generated and combined with the reproduced image of the series of broadcast information. When the commercial designation signal is input, the commercial broadcast information designated by the commercial designation signal is extracted and reproduced from the broadcast information stored at the storage step. At the following reproduction of the series of broadcast information, this already reproduced commercial broadcast information is not reproduced but skipped, and only the other broadcast information is reproduced.

BRIEF DESCRIPTION OF THE DRAWINGS

These and other objects and features of the present invention will become clearer from the following description of the preferred embodiments given with reference to the attached drawings, wherein:

FIG. 1 is a view of an example of the configuration of an information reproducing apparatus according to the present invention;

FIG. 2 is a view of another example of the configuration of an information reproducing apparatus according to the present invention;

FIG. 3 is a flow chart for explaining an example of a recording operation of broadcast data in a first embodiment of the present invention;

FIG. 4 is a flow chart for explaining an example of a reproduction operation of broadcast data in the first embodiment of the present invention;

FIGS. 5A and 5B are views showing examples of received broadcast data;

DESCRIPTION OF THE PREFERRED EMBODIMENTS

First Embodiment

Figure 6:
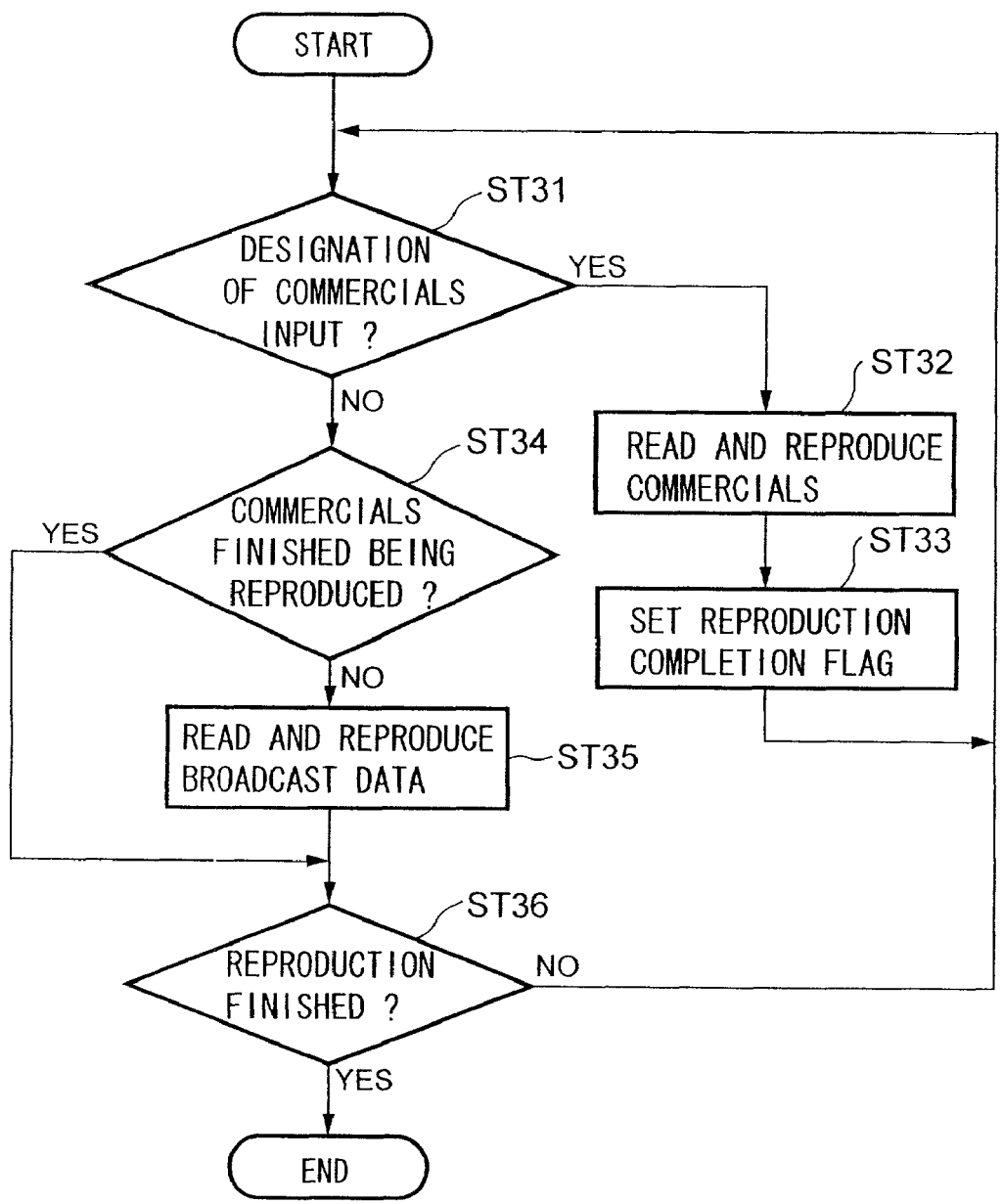
FIG. 6 is a flow chart for explaining an example of the reproduction operation of the broadcast data in a second embodiment of the present invention.

First, an explanation will be made of a first embodiment of the present invention by referring to FIG. 1 to FIGS. 5A and 5B.

FIG. 1 is a view of an example of the configuration of an information reproducing apparatus according to the present invention. The information reproducing apparatus 100 shown in FIG. 1 has a demodulator 1, analog/digital (A/D) converter 2, storage unit 3, digital/analog (D/A) converter 4, reproduction unit 5, commercial detector 6, controller 7, and input unit 8.

Below, an explanation will be made of the components of FIG. 1.

The demodulator 1 receives a broadcast signal Sv, demodulates it, and outputs the resultant signal to the A/D converter 2. For example, it selects the signal of a specific station from broadcast signals received at a not illustrated antenna, performs intermediate frequency amplification and detection for this to reproduce a composite video signal, further demodulates this to generate a luminance signal and a color difference signal or a color signal, and outputs the result to the A/D converter 2. Also, it performs intermediate frequency amplification and detection also on for example an audio signal contained in the broadcast signal, reproduces this, and outputs the result to the A/D converter 2.

The A/D converter 2 digitizes the broadcast signal containing the image signal, audio signal, etc. demodulated at the demodulator 1 and outputs the same to the storage unit 3 and the commercial detector 6.

The storage unit 3 stores the data of the broadcast signal (broadcast data) digitized at the A/D converter 2 in sequence under the control of the controller 7. Also, it stores the broadcast data linked with the sequence of digitalization at the A/D converter 2, that is, the sequence of the broadcast. Accordingly, by reading and reproducing the broadcast data of the storage unit 3 in sequence corresponding to this sequence, the broadcast data can be correctly reproduced in the sequence of the broadcast.

For example, by storing the broadcast data digitized at the A/D converter 2 and input to the storage unit 3 in sequence at an interval of a predetermined address from a predetermined header address, the address of the broadcast data and the input sequence of the data are linked, and the broadcast data can be read and reproduced according to the input sequence.

The D/A converter 4 converts the digital broadcast data read from the storage unit 3 to an analog signal and outputs the same to the reproduction unit 5. For example, it outputs the analog luminance signal, color difference signal, and audio signal to the reproduction unit 5.

The reproduction unit 5 is a block for reproducing the image, audio, etc. from the analog signal from the D/A converter 4 and is comprised by for example a CRT or speaker. Note that, in the case of a liquid crystal display or other apparatus receiving digital data to reproduce an image, it is also possible to directly input the digital data from the storage unit 3 to the reproduction unit 5 without going through the D/A converter 4.

The commercial detector 6 detects commercial portions from the broadcast data based on the broadcast data digitized at the A/D converter 2 and notifies the detection result to the controller 7.

The most reliable method for detecting a commercial portion is to add information for identifying the commercial portion (identification information) to the broadcast signal in advance and detecting this. For example, it is also possible to superimpose commercial identification use data on a portion which is not used in the broadcast signal (vertical retrace line period etc.) and detect this at the commercial detector 6. Alternatively, it is also possible to insert an electronic watermark for commercial identification into the image data of the commercial portion and decode this at the commercial detector 6.

Also, it is possible to detect a commercial portion by detecting a scene change at which the reproduced image of the broadcast data changes discontinuously. In general, it is known that in a commercial broadcast there is one scene change every 1 to 2 seconds and that in an ordinary broadcast, even in a news broadcast where there is a relatively large number of scene changes, there is one scene change every about 7 to 10 seconds. Therefore, a commercial broadcast can be detected by utilizing the difference of time intervals of scene changes.

Also, it is possible to detect a commercial portion from the change of the audio level by utilizing the fact that the audio level of a commercial portion becomes louder in comparison with a usual broadcast.

Other various techniques relating to the detection of commercial portions can be applied to the commercial detector 6.

The controller 7 is a block for controlling the operation of the information reproducing apparatus 100 relating to the recording and reproduction of a broadcast signal according to instruction Sc of an user input from the input unit 8.

For example, when an instruction for storing the broadcast of a specific station to be broadcast at a specific time in the storage unit 3 as the broadcast data is input from the input unit 8, at this specific time, the demodulator 1 is made to receive and demodulate the broadcast signal of the specific station and the demodulated image signal and audio signal are converted to digital broadcast data at the A/D converter 2 and stored in the storage unit 3 in sequence. At this time, when a commercial portion is detected in the broadcast data at the commercial detector 6, information for specifying a storage area where the broadcast data of this commercial is to be stored in the storage unit 3 is stored in a not illustrated storage unit (or also the storage unit 3 can be used) in sequence. For example, the address at which the header data of the detected commercial portion is stored and the information concerning the commercial time contained in the broadcast data (that is information concerning the data length of the commercial portion) are stored linked with the sequence of detection of the commercial portion. The storage area of the commercial portion in the storage unit 3 can be specified from the information of the stored address and data length.

Also, when an instruction for reproducing the broadcast data stored in the storage unit 3 is input from the input unit 8, first the commercial portion contained in the broadcast for which reproduction is instructed is read from the storage unit 3 in sequence based on the information specifying the storage region, this is converted to an analog signal at the D/A converter 4, then is reproduced as the image, audio, etc. at the reproduction unit 5. Then, when all of the commercial portions contained in this instructed broadcast are reproduced, the broadcast data of the other portion other than the commercial portions of this broadcast is sequentially read from the storage unit 3 and reproduced.

In addition to the mode of initially continuously reproducing only the commercial portions in this way, in accordance with an instruction Sc from the user, it is also possible to select a usual reproduction mode, that is, a mode of reproducing the broadcast data in sequence while keeping the sequence set at the station.

Also, in order to make sure that the user watches the commercial broadcast, it is also possible to have the user perform a certain input operation in the period where the commercial portions are continuously reproduced. For example, in this commercial period, an image, audio, or other message prompting an input operation of the user is reproduced at the reproduction unit 5 and the reproduction of the commercial portions and the rest of the broadcast is suspended. When a response from the user with respect to this message is input to the input unit 8, the reproduction of the broadcast is restarted. By this, even in the continuous reproduction period of commercial portions, the attention of the user can be turned to the commercial broadcast.

The input unit 8 is a block for receiving as input an instruction Sc from the user and outputting the same to the controller 17. Various man-machine interfaces, for example, a remote controller generally attached to a VTR, television receiver, or the like or a mouse attached to a computer can be applied as this input unit 8.

The broadcast signal demodulated at the demodulator 1 of the information reproducing apparatus 100 shown in FIG. 1 is an analog signal, but the present invention can also be applied to the case where this is a digital data.

FIG. 2 is a view of another example of the configuration of the information reproducing apparatus according to the present invention. The broadcast signal demodulated in this example is compressed and encoded digital data. An information reproducing apparatus 101 shown in FIG. 2 has a demodulator 11, packet demultiplexer 12, storage unit 13, decoder 14, D/A converter 15, reproduction unit 16, commercial detector 17, controller 18, and input unit 19.

Note that, the storage unit 13, D/A converter 15, reproduction unit 16, controller 18, and input unit 19 in the example of the configuration of FIG. 2 have equivalent functions to those of the storage unit 3, D/A converter 4, reproduction unit 5, controller 7, and input unit 8 in the example of the configuration of FIG. 1, so an explanation for these will be omitted below and an explanation will be only made of the demodulator 11, packet demultiplexer 12, decoder 14, and commercial detector 17.

The demodulator 11 demodulates the digital demodulated broadcast signal and outputs packets of the broadcast data compressed, encoded, and/or multiplexed by a method of for example the MPEG2 to the packet demultiplexer 12.

The packet demultiplexer 12 demultiplexes and extracts the packets containing the target broadcast data from among the multiplexed packets of the broadcast data and outputs the same to the storage unit 13 and the commercial detector 17.

The commercial detector 17 detects the commercial portions from the broadcast based on predetermined identification information contained in the packets extracted at the packet demultiplexer 12. Note that, it is also possible to apply other various commercial detection methods explained concerning the commercial detector 6 of FIG. 1 to this commercial detector 17.

The decoder 14 decodes the compressed and encoded broadcast data to reproduce the broadcast signal containing the image data, audio data, etc. and outputs this to the D/A converter 15.

Next, an explanation will be made of the concrete operation of the information reproducing apparatus shown in FIG. 1 or FIG. 2.

FIG. 3 is a flow chart for explaining an example of the recording operation of the broadcast data in the first embodiment of the present invention.

Step ST11

In the information reproducing apparatus 100 of FIG. 1, when an instruction for recording a broadcast of a specific station at a specific time is set in the controller 7 by an instruction Sc of the user input to the input unit 8, the broadcast of the specific station is received and demodulated at the demodulator 1 at this specific time and the demodulated analog signal is digitized at the A/D converter 2 and stored in the storage unit 3 in sequence.

In the same way, in the information reproducing apparatus 101 of FIG. 2, a broadcast of a specific station is received and demodulated at the demodulator 1 at a specific time in response to an instruction Sc of the user input to the input unit 19 and the packets of the specific broadcast are extracted from the demodulated packets at the packet demultiplexer 12 and stored in the storage unit 13 in sequence.

Step ST12

It is detected at the commercial detector 6 (commercial detector 17 in FIG. 2) if the broadcast data stored in the storage unit 3 (storage unit 13 in FIG. 2) includes commercial portions. When it is detected that the broadcast data includes commercial portions, step ST13 is executed.

Step ST13

When it is detected at step ST12 that the broadcast data contains commercial portions, information for specifying the areas where the commercial portions are stores in the storage unit 3 (storage unit 13 in FIG. 2) is stored in a not illustrated storage unit.

Step ST14

It is decided at the controller 7 (controller 18 in FIG. 2) whether or not to finish the recording of the broadcast data in the storage unit 3 (storage unit 13 in FIG. 2). For example, this is decided in accordance with the recording end time of the broadcast set by an instruction of the user from the input unit 8.

In this way, the commercial portions in the broadcast data stored in the storage unit 3 (storage unit 13 in FIG. 2) are specified. In the reproduction operation of the broadcast data mentioned next, the specified commercial portions are reproduced all together at the start of the reproduction.

FIG. 4 is a flow chart for explaining an example of the reproduction operation of broadcast data in the first embodiment of the present invention.

Step ST21

When reproduction of the broadcast data stored in the storage unit 3 is instructed in an instruction Sc from the user input to the input unit 8, the commercial portions of the broadcast data whose storage areas are specified as mentioned above are read from the storage unit 3, converted to an analog signal at the D/A converter 4, and reproduced at the reproduction unit 5 as an image, audio, etc.

Similarly, in the information reproducing apparatus 101 of FIG. 2, the commercial portions of the broadcast data whose storage areas are specified are read from the storage unit 13, decoded to the image data and audio data at the decoder 14, converted to an analog signal at the D/A converter 15, and reproduced at the reproduction unit 16.

Note that to make sure that the user watches the commercial broadcast, it is also possible to have the user to perform a certain input operation at this step. For example, an image, audio, etc. for prompting an input operation of the user is reproduced at the reproduction unit 5 (reproduction unit 16 in FIG. 2) and, at the same time, the reproduction of the commercial portions and rest of the broadcast is suspended. When a response from the user with respect to this is input to the input unit 8 (input unit 19 in FIG. 2), the reproduction of the broadcast is restarted. By this, even in the continuous reproduction period of commercial portions, the attention of the user can be turned to the commercial broadcast.

Step ST22

It is decided at the controller 7 (controller 18 in FIG. 2) whether or not the reproduction of the commercial portions whose storage areas were specified in advance has finished. When the reproduction of the commercial broadcast has finished, the processing proceeds to step ST23, while when the reproduction has not been finished, the processing returns to step ST21, and the processing for reproduction of the commercial portions which have not yet been reproduced is carried out.

Step ST23

After the reproduction of the commercial portions has finished, the broadcast data other than the commercials is read from the storage unit 3 (storage unit 13 in FIG. 2) and reproduced in sequence.

Step ST24

It is decided at the controller 7 (controller 18 in FIG. 2) whether or not to finish the reproduction of the broadcast. For example, the reproduction of the broadcast is finished when the tail end of the broadcast data stored in the storage unit 3 (storage unit 13 in FIG. 2) is reached or when the end of reproduction of the broadcast is instructed by the user from the input unit 8 (input unit 19 in FIG. 2). Also, when such conditions for the end of reproduction are not satisfied, the processing routine returns to step ST23, and the reproduction of the broadcast data is continued.

FIGS. 5A and 5B show examples of the received broadcast data.

FIG. 5A shows the broadcast data arranged in the sequence set on the station side. The broadcast data P1 to broadcast data P12 of FIG. 5A show the commercial portions, while the broadcast data P101 to broadcast data P103 show the broadcast other than the commercial broadcast. In the example of FIG. 5A, the broadcast other than the commercial broadcast is divided into three sections.

Also, identification data CMA-1 to identification data CMD-2 corresponding to the commercial portions and time data concerning the time of the commercial portions are added to the broadcast data of the commercial portions. By the detection of these data at the commercial detector 6 (commercial detector 17 in FIG. 2), the commercial portions are identified from the broadcast data.

FIG. 5B shows broadcast data whose reproduction sequence is changed at the information reproducing apparatus shown in FIG. 1 or FIG. 2. All of the broadcast data of the commercial portions inserted in the broadcast data of FIG. 5A are collected in an initial stage of the reproduction, while the broadcast other than the commercial portions are collected after that.

As explained above, according to the information reproducing apparatus shown in FIG. 1 or FIG. 2, a sequentially supplied series of broadcast data is stored in the storage unit 3 (storage unit 13 in FIG. 2) linked with the supplied sequence. Also, based on the predetermined identification information contained in this broadcast data, the commercial portions of the broadcast data are detected at the commercial detector 6 (commercial detector 17 in FIG. 2). At the time of reproduction of the broadcast data, the detected commercial portions are first read from the storage unit 3 (storage unit 13 in FIG. 2) in sequence and reproduced to image, audio, etc. at the reproduction unit 5 (reproduction unit 16 in the figure). Then, when the detected commercial portions are all reproduced, the other series of broadcast data other than the commercial portion is read from the storage unit 3 (storage unit 13 in FIG. 2) in sequence in accordance with the supplied sequence and reproduced at the reproduction unit 5 (reproduction unit 16 in the FIG. 2). Accordingly, for content which ends up being reduced in interestingness due to the insertion of commercial broadcasts in the middle, for example, movies, viewing becomes possible without interrupting the broadcast and therefore user dissatisfaction over commercial broadcasts can be reduced. Also, a different method of viewing of commercial broadcasts which are ordinarily boring is provided to the user and, at the same time, the commercial broadcasts are positively watched in comparison with the case where commercial broadcasts are unnaturally inserting not along with the flow of the broadcast contents. Therefore, the effect of the commercial broadcasts as advertisements can be raised.

Also, at the time of reproduction of the commercial portions, it is possible to have the reproduction unit 5 (reproduction unit 16 in FIG. 2) reproduce a message for confirming the viewing of the commercial broadcast of the user at least one time and, at the same time, suspend the read operation of the broadcast data from the storage unit 3 (storage unit 13 in FIG. 2) and to restart the read operation and reproduction of the broadcast data when a response from the user with respect to this message is input to the input unit 8. By this, the user can be made to watch the commercial broadcasts which are reproduced all together, so the effect of the commercial broadcasts as advertisements can be raised.

Note that the sequence of reproducing the commercial portions may be the sequence of receiving them (that is, the broadcast sequence set on the station side) or the reproduction may be carried out by rearranging the sequence at random.

Second Embodiment

Next, an explanation will be made of a second embodiment of the present invention by referring to FIG. 6 and FIG. 7.

The second embodiment is for displaying images corresponding to commercial portions specified at the time of recording a broadcast combined with the usual reproduced image of the broadcast to thereby enable the viewing of commercial broadcasts freely selected by the user in the middle of the reproduction of the broadcast.

Note that, as an example of the configuration of the information reproducing apparatus according to the second embodiment, the one explained in FIG. 1 or FIG. 2 can be applied as it is, so an explanation of the configuration of the apparatus is omitted. Also, FIG. 1 and FIG. 2 will be referred to in the following explanation.

Also, the recording operation of the broadcast data in the present embodiment is equivalent to the operation of the first embodiment explained by referring to the flow chart of FIG. 3, so also an explanation of this will be omitted. Hereinafter, the explanation will be made of the reproduction operation of the broadcast data according to the present embodiment.

When a signal from the user for instructing reproduction of the recorded broadcast is input to the input unit 8 (input unit 19 in FIG. 2), the instructed broadcast is read from the storage unit 3 (storage unit 13 in FIG. 2) and reproduced. Also, together with this, images corresponding to the commercial portions of the instructed broadcast, for example, still images of the header portions of the commercial broadcasts or text, graphics, etc. indicating information relating to the commercial broadcasts (for example, information of the time of the commercial broadcasts) detected from the broadcast data are displayed at a predetermined portion on the screen. For example, in the example of the display screen of the reproduction portion shown in FIG. 7, the still images of the commercial broadcasts I2 are displayed in a line at an upper portion of a usually reproduced broadcast I1 according to the sequence of reproduction.

FIG. 6 is a flow chart for explaining an example of the reproduction operation of the broadcast data in the second embodiment of the present invention.

Step ST31

Figure 7:
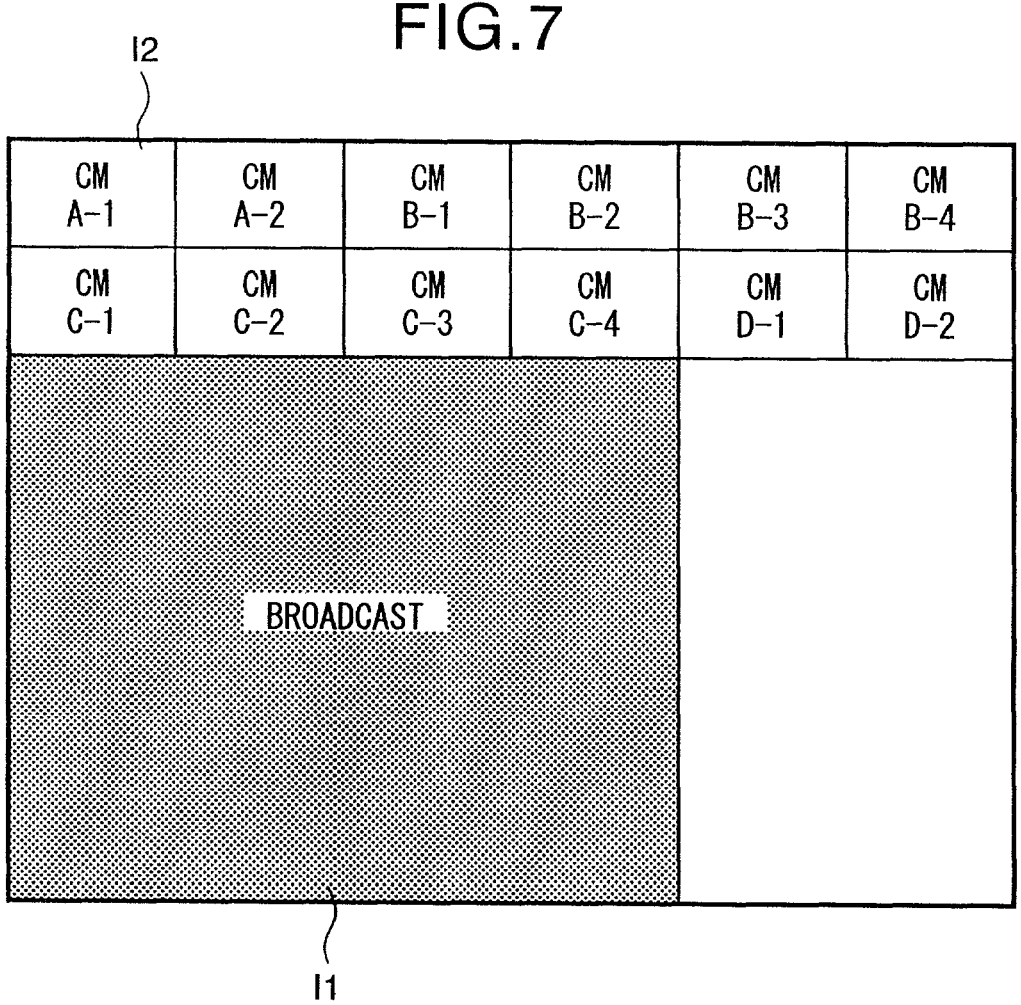
FIG. 7 is a view of an example of a reproduced image of the broadcast data.

It is decided whether or not the images corresponding to the commercial broadcasts displayed in the line on the display screen as in FIG. 7 are designated for viewing by an instruction Sc from the user input to the input unit 8. For example, a specific commercial broadcast is designated for viewing by the input of for example a number designating the commercial broadcast from a remote controller. When a commercial broadcast is designated for viewing, the broadcast being reproduced is interrupted and the processing shifts to step ST32.

Step ST32

The designated commercial broadcast is read from the storage unit 3 (storage unit 13 in FIG. 2) and reproduced. Also, after the reproduction of this commercial broadcast, an image, text, or graphic indicating that this commercial broadcast has been already reproduced is displayed on the display screen of the reproduction unit.

Alternatively, it is also possible to erase the image, text, or graphic corresponding to this commercial broadcast from the top of the display screen after the reproduction of the commercial broadcast. In this case, after all commercial broadcasts have finished being viewed, the commercial portions are all erased from the display screen.

Step ST33

A flag indicating reproduction has been finished is set in each commercial broadcast reproduced at step ST32, then the processing returns to step ST31.

Step ST34

When no commercial broadcast is designated at step ST31, in this step, it is decided whether or not the broadcast data to be reproduced is a commercial broadcast. When it is a commercial broadcast, it is further decided whether or not the reproduction completion flag has been set for this commercial broadcast. When the reproduction completion flag has been set, the processing skips to step ST36, and this commercial portion is not reproduced.

Step ST35

When it is decided that the broadcast data to be reproduced at step ST34 is not a commercial broadcast or when it is decided that the broadcast data is a commercial, but has not yet been reproduced, this broadcast data is read from the storage unit 3 (storage unit 13 in FIG. 2) and reproduced.

Step ST36

It is decided at the controller 7 (controller 18 in FIG. 2) whether or not to finish the reproduction of the broadcast. For example, the reproduction of the broadcast is finished when the broadcast data stored in the storage unit 3 (storage unit 13 in FIG. 2) is finished or the end of reproduction of the broadcast is instructed by the user from the input unit 8 (input unit 19 in FIG. 2). When such conditions for the end of reproduction are not satisfied, the processing returns to step ST31, and the reproduction of the broadcast data is continued.

As explained above, according to the information reproducing apparatus shown in FIG. 1 or FIG. 2 according to the present embodiment, a sequentially supplied series of broadcast data is stored in the storage unit 3 (storage unit 13 in FIG. 2) linked with the supplied sequence. Also, based on the predetermined identification information contained in this broadcast data, the commercial portions of the broadcast data are detected at the commercial detector 6 (commercial detector 17 in FIG. 2). At the time of reproduction of the broadcast data, a series of broadcast data is read from the storage unit 3 (storage unit 13 in FIG. 2) in sequence in accordance with the supplied sequence and reproduced at the reproduction unit 5 (reproduction unit 16 in FIG. 2) and, at the same time, image information corresponding to the detected commercial broadcast information is generated and reproduced combined with the reproduced image of the series of broadcast data. Also, when a signal designating a commercial broadcast to be watched is input to the input unit 8 (input unit 19 in FIG. 2), the commercial broadcast designated by this signal is read from the storage unit 3 (storage unit 13 in FIG. 2) and reproduced. After this, at the time of reproduction of this series of broadcast data, the already reproduced commercial portions are no longer reproduced, but skipped, and the following broadcast data is reproduced. Accordingly, since images, text, or graphics corresponding to the commercial broadcasts contained in the reproduced broadcast are displayed to the user on the reproduction screen, the user can be made to watch the commercial broadcasts. Also, the user can select and watch commercial broadcasts at any point of time and in any sequence, therefore the opportunity for selecting and watching the commercial broadcasts by his or her own intent is given to the user—who has conventionally been made to watch commercial broadcasts in a passive state—and a different method of viewing usually boring commercial broadcasts is provided to the user, so the effect of the commercial broadcasts as advertisements can be raised.

Summarizing the effects of the invention, according to the present invention, a user can be made to watch the commercial broadcasts. Also, a method of viewing commercial broadcasts different from the conventional method is provided to the user. At the same time, the method of viewing commercial broadcasts can be designated in accordance with the intent of the user. Therefore, the effect of the commercial broadcasts as advertisements can be raised.

While the invention has been described with reference to specific embodiments chosen for purpose of illustration, it should be apparent that numerous modifications could be made thereto by those skilled in the art without departing from the basic concept and scope of the invention.

What is claimed is:

1. An information reproducing apparatus comprising:
a receiver for receiving sequential supplied series of broadcast information having a first sequence of broadcast portions and a second sequence of commercial broadcast information, the commercial broadcast information separating the broadcast portions;
a storing means for storing the sequentially supplied series of the broadcast information;
a commercial detecting means for detecting the commercial broadcast information from said received broadcast information based on predetermined identification information contained in said received broadcast information,
wherein when the commercial broadcast information is detected from the broadcast information, a storage address of the commercial broadcast information in the storing means is stored;
a reproducing means for reproducing the broadcast information stored in said storing means on a display device;
an inputting means for inputting a commercial designation signal for designating the commercial broadcast information to be reproduced at said reproducing means; and
a controlling means for sequentially reading said series of broadcast information from said storing means and making said reproducing means reproduce the same in accordance with said supplied sequence, generating image information corresponding to said detected commercial broadcast information and combining the same with the reproduced image of said series of broadcast portions, and making said reproducing means reproduce the combined image information, and,
when said commercial designation signal is input, reading the commercial broadcast information designated by the related commercial designation signal from said storing means and making said reproducing means reproduce all the commercial broadcast information in the second sequence as supplied in the broadcast information, and,
in the following reproduction of said series of broadcast information, reproducing the broadcast portions while not reproducing, but skipping over the commercial broadcast information which has been already reproduced,
wherein the reproducing means reproduces the broadcast portions together with information related to each of a plurality of commercial broadcast information, said information related to each of a plurality of commercial broadcast information being one selected from the group consisting of a still image, text, and graphic each displayed in a line at an upper portion of the display according to the second sequence, the information related to the selected one of the plurality of commercial broadcast information is replaced with a different still image, text, or graphic after the reproduction of the selected commercial broadcast information, the different still image, text, or graphic related to the selected commercial broadcast and indicating that the selected commercial broadcast information has been already reproduced,
wherein all of the commercial broadcast information separating the broadcast portions are collected and reproduced in an initial stage of the reproduction, and the separated broadcast portions other than the commercial broadcast information are collected and reproduced after the commercial broadcast information, and
wherein a commercial broadcast information is reproduced in any desired order by selection from the information displayed in the line at the upper portion of the display.

2. An information reproducing apparatus as set forth in claim 1, wherein said controlling means generates a viewing confirmation message at least one time, makes said reproducing means reproduce it, and suspends a read operation of the broadcast information from said storing means at the time of reproduction of said commercial broadcast information and restarts the read operation of said broadcast information when a response signal with respect to the related viewing confirmation message is detected.

3. An information reproducing apparatus as set forth in claim 1, wherein said controlling means sequentially reads said detected commercial broadcast information from said storing means in accordance with a sequence by which said commercial broadcast information was supplied.

4. An information reproducing apparatus as set forth in claim 1, wherein said controlling means sequentially reads commercial broadcast information specified by an address of a head part stored in said storing means and a data length designated in said identification information from said storing means.

5. An information reproducing apparatus as set forth in claim 1, wherein said commercial detecting means detects said commercial broadcast information based on electronic watermark information included in image data of said broadcast information.

6. An information reproducing apparatus as set forth in claim 1, wherein said controlling means suspends reproduction of said series of broadcast information and makes said reproducing means reproduce designated commercial broadcast information when said commercial designation signal is input.

7. An information reproducing apparatus as set forth in claim 1, wherein said controlling means combines a still image of a reproduced image of said detected commercial broadcast information and a reproduced image of said series of broadcast information and makes said reproducing means reproduce the same.

8. An information reproducing apparatus as set forth in claim 7, wherein said controlling means erases the still image of said commercial broadcast information from a display area of said reproducing means in the subsequent reproduction of the series of broadcast information when commercial broadcast information has been reproduced in accordance with said commercial designation signal.

9. An information reproducing apparatus as set forth in claim 7, wherein said controlling means changes the still image of said commercial broadcast information to a predetermined image showing the commercial broadcast information finished being reproduced in the subsequent reproduction of the series of broadcast information when commercial broadcast information has been reproduced in accordance with said commercial designation signal.

10. An information reproducing apparatus as set forth in claim 1, wherein said controlling means sequentially reads commercial broadcast information specified by an address of a head part stored in said storing means and a data length designated in said identification information from said storing means.

11. An information reproducing apparatus as set forth in claim 1, wherein said commercial detecting means detects said commercial broadcast information based on electronic watermark information included in image data of said broadcast information.

12. An information reproducing apparatus as set forth in claim 1, wherein said commercial detecting means detects scene changes where a reproduced image of said broadcast information changes discontinuously and detects said commercial broadcast information based on a time interval at which said detected scene changes occur in said reproduced image.

13. An information reproducing apparatus as set forth in claim 1, wherein said commercial detecting means detects said commercial broadcast information based on fluctuations in the reproduced sound level of said broadcast information.

14. An information reproduction method including:
a storage step for storing a sequentially received series of broadcast information linked with a supplied a first sequence of broadcast portions and a second sequence of commercial broadcast information, the commercial broadcast information separating the broadcast portions;
a commercial detection step for detecting commercial broadcast information from said received broadcast information based on predetermined identification information contained in said received broadcast information,
wherein when the commercial broadcast information is detected from the broadcast information, a storage address of the commercial broadcast information is stored, and
a reproduction step for extracting and reproducing on a display device all said detected commercial broadcast information in the second sequence as supplied from the received broadcast information stored at said storage step and, when said detected commercial broadcast information is all reproduced, sequentially extracting and reproducing the broadcast portions from the broadcast information stored at said storage step in accordance with said supplied sequence while not reproducing, but skipping over the commercial broadcast information which has been already reproduced,
wherein the reproducing step reproduces the broadcast portions together with information related to each of a plurality of commercial broadcast information, said information related to each of a plurality of commercial broadcast information being one selected from the group consisting of a still image, text, and graphic displayed together in a line at an upper portion of the display according to the second sequence, the information related to the selected one of the plurality of commercial broadcast information is replaced with a different still image, text, or graphic after the reproduction of the selected commercial broadcast information, the different still image, text, or graphic related to the selected commercial broadcast and indicating that the selected commercial broadcast information has been already reproduced,
wherein all of the commercial broadcast information separating the broadcast portions are collected and reproduced in an initial stage of the reproduction, and the separated broadcast portions other than the commercial broadcast information are collected and reproduced after the commercial broadcast information, and
wherein a commercial broadcast information is reproduced in any desired order by selection from the information displayed in the line at the upper portion of the display.

15. An information reproduction method as set forth in claim 14, wherein said reproduction step is for generating and reproducing a viewing confirmation message at least one time and suspending the reproduction of said broadcast information at the time of reproduction of said commercial broadcast information and restarting the reproduction of said broadcast information when a response signal with respect to the related viewing confirmation message is detected.

16. An information reproduction method as set forth in claim 14, wherein said reproduction step is for reproducing said detected commercial broadcast information in accordance with a sequence by which said commercial broadcast information was supplied.

17. An information reproduction method as set forth in claim 14, wherein said commercial detection step is for detecting said commercial broadcast information based on electronic watermark information included in image data of said broadcast information.

18. An information reproducing method as set forth in claim 14, wherein said commercial detection step is for detecting scene changes where a reproduced image of said broadcast information changes discontinuously and detecting said commercial broadcast information based on a time interval at which said detected scene changes occur in said reproduced image.

19. An information reproducing method as set forth in claim 14, wherein said commercial detection step is for detecting said commercial broadcast information based on fluctuations in the reproduced sound level of said broadcast information.

20. An information reproduction method including:
a storage step for storing a sequentially received series of broadcast information linked with a supplied a first sequence of broadcast portions and a second sequence of commercial broadcast information, the commercial broadcast information separating the broadcast portions;
a commercial detection step for detecting commercial broadcast information from said received broadcast information based on predetermined identification information contained in said received broadcast information,
wherein when the commercial broadcast information is detected from the broadcast information, a storage address of the commercial broadcast information is stored, and
a reproduction step for sequentially extracting and reproducing on a display device all said series of broadcast information in the second sequence as supplied from among the broadcast information stored at said storage step in accordance with said supplied sequence and, at the same time, generating image information corresponding to said detected commercial broadcast information and combining the same with the reproduced image of said series of broadcast information, and, when said commercial designation signal is input, extracting and reproducing the commercial broadcast information designated by the commercial designation signal from the broadcast information stored at said storage step and, in the following reproduction of said series of broadcast information, reproducing the broadcast portions while not reproducing, but skipping the already reproduced commercial broadcast information,
wherein the reproducing step reproduces the broadcast portions together with information related to each of a plurality of commercial broadcast information, said information related to each of a plurality of commercial broadcast information being one selected from the group consisting of a still image, text, and graphic displayed together in a line at an upper portion of the display according to the second sequence, the information related to the selected one of the plurality of commercial broadcast information is replaced with a different still image, text, or graphic after the reproduction of the selected commercial broadcast information, the different still image, text, or graphic related to the selected commercial broadcast and indicating that the selected commercial broadcast information has been already reproduced, wherein all of the commercial broadcast information separating the broadcast portions are collected and reproduced in an initial stage of the reproduction, and the separated broadcast portions other than the commercial broadcast information are collected and reproduced after the commercial broadcast information, and wherein a commercial broadcast information is reproduced in any desired order by selection from the information displayed in the line at the upper portion of the display.

21. An information reproduction method as set forth in claim 20, wherein said reproduction step is for suspending reproduction of said series of broadcast information and reproducing designated commercial broadcast information when said commercial designation signal is input.

22. An information reproduction method as set forth in claim 20, wherein said reproduction step is for combining a still image of a reproduced image of said detected commercial broadcast information and a reproduced image of said series of broadcast information.

23. An information reproduction method as set forth in claim 22, wherein said reproduction step is for erasing the still image of said commercial broadcast information from a display area of a reproduced image in the subsequent reproduction of the series of broadcast information when commercial broadcast information has been reproduced in accordance with said commercial designation signal.

24. An information reproduction method as set forth in claim 22, wherein said reproduction step is for changing the still image of said commercial broadcast information to a predetermined image showing the commercial broadcast information finished being reproduced in the subsequent reproduction of the series of broadcast information when commercial broadcast information has been reproduced in accordance with said commercial designation signal.

25. An information reproduction method as set forth in claim 20, wherein said commercial detection step is for detecting said commercial broadcast information based on electronic watermark information included in image data of said broadcast information.

26. An information reproducing method as set forth in claim 20, wherein said commercial detection step is for detecting scene changes where a reproduced image of said broadcast information changes discontinuously and detecting said commercial broadcast information based on a time interval at which said detected scene changes occur in said reproduced image.

27. An information reproducing method as set forth in claim 20, wherein said commercial detection step is for detecting said commercial broadcast information based on fluctuations in the reproduced sound level of said broadcast information.

28. An information reproducing method, comprising:

receiving sequential broadcast information having a plurality of broadcast portions and a plurality of broadcast commercial portions, the plurality of broadcast commercial portions in a broadcast sequence and separating the broadcast portions;

storing the sequential broadcast information in the sequence as received;

detecting commercial broadcast information from said received broadcast information based on predetermined identification information contained in said received broadcast information,
   wherein when the commercial broadcast information is detected from the broadcast information, a storage address of the commercial broadcast information is stored;

reproducing on a display device, in response to a request for reproduction of the sequential broadcast information, all the plurality of broadcast commercial portions in the broadcast sequence; and subsequently reproducing the stored sequential broadcast information broadcast portions in the received sequence by reproducing the broadcast portions and not reproducing the broadcast commercial portions, wherein the reproducing reproduces the broadcast portions together with information related to each of a plurality of broadcast commercial portions, said information related to each of a plurality of broadcast commercial portions being one selected from the group consisting of a still image, text, and graphic displayed together in a line at an upper portion of the display according to the second sequence, second sequence, the information related to the selected one of the plurality of commercial broadcast information is replaced with a different still image, text, or graphic after the reproduction of the selected commercial broadcast information, the different still image, text, or graphic related to the selected commercial broadcast and indicating that the selected commercial broadcast information has been already reproduced, wherein all of the commercial broadcast information separating the broadcast portions are collected and reproduced in an initial stage of the reproduction, and the separated broadcast portions other the commercial broadcast information are collected and reproduced after the commercial broadcast information, and wherein a commercial broadcast information is reproduced in any desired order by selection from the information displayed in the line at the upper portion of the display.

\* \* \* \* \*